United States Patent
Chang et al.

(10) Patent No.: US 6,268,449 B1
(45) Date of Patent: *Jul. 31, 2001

(54) PROCESS FOR SYNTHESIZING TEMPERATURE-RESPONSIVE N-ISOPROPYLACRYLAMIDE POLYMERS

(75) Inventors: Yihua Chang; Pavneet Singh Mumick, both of Appleton, WI (US)

(73) Assignee: Kimberly-Clark Worldwide, Inc., Neenah, WI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/771,613

(22) Filed: Dec. 20, 1996

(51) Int. Cl.[7] ................. C08F 2/16; C08F 2/42; C08F 20/54

(52) U.S. Cl. .......... 526/212; 526/210; 526/211; 526/206; 526/224; 526/301.1; 526/307.2; 524/555

(58) Field of Search .................. 526/224, 212, 526/211, 210, 206, 301.1, 307.2; 524/555

(56) References Cited

U.S. PATENT DOCUMENTS

| | | | |
|---|---|---|---|
| 3,315,014 | 4/1967 | Coover, Jr. et al. | 260/895 |
| 3,354,238 | 11/1967 | Schmitt et al. | 260/876 |
| 4,151,333 | * 4/1979 | Lenke | 521/95 |
| 4,395,524 | * 7/1983 | Emmons | 526/307.2 |
| 5,041,503 | * 8/1991 | Dauplaise | 525/283 |
| 5,171,808 | * 12/1992 | Ryles | 526/264 |
| 5,300,358 | 4/1994 | Evers | 428/286 |
| 5,509,913 | 4/1996 | Yeo | 604/364 |

FOREIGN PATENT DOCUMENTS

| | | | |
|---|---|---|---|
| 866281 | 3/1971 | (CA) . | |
| 0 363 797 A2 | 4/1990 | (EP) | C08L/69/00 |
| 0 604 730 A1 | 7/1994 | (EP) | A61L/15/62 |
| 6-233809 | 8/1994 | (JP) | A61L/15/16 |
| WO 87/06152 A1 | 10/1987 | (WO) | B01D/15/00 |

OTHER PUBLICATIONS

Derwent World Patent Database abstract of EP 363,797: Description of E. Baumgartner et al., "Thermoplastic Moulding Composition.".

Suen, T.J., A.M. Schiller, and W.N. Russell, "Polymerization of Acrylamide in Aqueous Solution by a Continuous Process," *Polymerization And Polycondensation Processes*, American Chemical Society, Washington, D.C., 1962, pp. 217–224.

Loh, F.C. et al., "Structural Studies of Polyethylene, Poly-(Ethylene Terephthalate) and Polystyrene Films Modified By Near U.V. Light Induced Surface Graft Copolymerization," *Polymer*, vol. 36, No. 1, 1995, pp. 21–27.

Jin, M.R. et al., "The Swelling Behaviour of Poly(N–n–Propylacrylamide) Hydrogel," *Polymer*, vol. 36, No. 1, 1995, pp. 221–222.

* cited by examiner

Primary Examiner—Donald R. Wilson
(74) Attorney, Agent, or Firm—Kilpatrick Stockton LLP

(57) ABSTRACT

Disclosed is a process for preparing temperature-responsive polymers that may be formed into a thermally-processable form which exhibits flushability properties when immersed in water such that the temperature-responsive polymer may be used in a disposable absorbent product to impart flushability properties to the product. The process prepares the temperature-responsive polymer in an aqueous solution using a chain transfer agent such as isopropanol.

18 Claims, No Drawings

PROCESS FOR SYNTHESIZING TEMPERATURE-RESPONSIVE N-ISOPROPYLACRYLAMIDE POLYMERS

BACKGROUND OF THE INVENTION

1. Field of the Invention

The present invention relates to a process for preparing temperature-responsive polymers that may be formed into a thermally-processable material which exhibits flushability properties when immersed in water such that the temperature-responsive polymer may be used in a disposable absorbent product to impart flushability properties to the product. The process prepares the temperature-responsive polymer in an aqueous solution using a chain transfer agent.

2. Description of the Related Art

Disposable absorbent products currently find widespread use in many applications. For example, in the infant and child care areas, diapers and training pants have generally replaced reusable cloth absorbent articles. Other typical disposable absorbent products include feminine care products such as sanitary napkins or tampons, adult incontinence products, and health care products such as surgical drapes or wound dressings. A typical disposable absorbent product generally comprises a composite structure including a topsheet, a backsheet, and an absorbent structure between the topsheet and backsheet. These products usually include some type of fastening system for fitting the product onto the wearer.

Disposable absorbent products are typically subjected to one or more liquid insults, such as of water, urine, menses, or blood, during use. As such, the outer cover backsheet materials of the disposable absorbent products are typically made of liquid-insoluble and liquid impermeable materials, such as polypropylene films, that exhibit a sufficient strength and handling capability so that the disposable absorbent product retains its integrity during use by a wearer and does not allow leakage of the liquid insulting the product.

Although current disposable baby diapers and other disposable absorbent products have been generally accepted by the public, these products still have need of improvement in specific areas. For example, many disposable absorbent products can be difficult to dispose of into an aqueous environment. For example, attempts to flush many disposable absorbent products down a toilet into a sewage system typically lead to blockage of the toilet or pipes connecting the toilet to the sewage system. In particular, the outer cover materials typically used in the disposable absorbent products generally do not disintegrate or disperse when flushed down a toilet so that the disposable absorbent product cannot be disposed of in this way. If the outer cover materials are made very thin in order to reduce the overall bulk of the disposable absorbent product so as to reduce the likelihood of blockage of a toilet or a sewage pipe, then the outer cover material typically will not exhibit sufficient strength to prevent tearing or ripping as the outer cover material is subjected to the stresses of normal use by a wearer.

As such, there is a need for new materials that are relatively easy to process and may be used in disposable absorbent products that generally retain their integrity and strength during use, but after such use, the products may be disposed of into an aqueous environment. For example, the disposable absorbent product may be easily and efficiently disposed of by flushing the disposable absorbent product down a toilet. Such a disposable absorbent product would then be capable of being degraded by a liquid sewage system as compared to having to be disposed of into a landfill or other solid waste disposal system.

Processes known to be useful in preparing temperature-responsive polymers include free-radical solution polymerization, inverse suspension polymerization, or polymerization in organic solvents. However, such processes have generally been found to result in the temperature-responsive polymer being substantially crosslinked and/or exhibiting an intrinsic viscosity that is too high so as to prevent the temperature-responsive polymer from being capable of being thermally processable.

As such, there is a need for a process that is relatively easy to use and which process results in a temperature-responsive polymer that may then be thermally processed to prepare a material form that may be used in a disposable absorbent product to impart flushability properties to the product.

SUMMARY OF THE INVENTION

In one aspect, the present invention concerns a process for preparing a temperature-responsive polymer that exhibits an effectively low intrinsic viscosity such that the temperature-responsive polymer may then be thermally processed to prepare a flushable material.

In one embodiment of the present invention, the process comprises forming a mixture comprising water, an effective amount of a chain transfer agent, a monomer capable of being polymerized to prepare a temperature-responsive polymer, and a reaction catalyst, wherein the mixture is prepared under conditions effective to polymerize the monomer to form a temperature-responsive polymer that exhibits an intrinsic viscosity that is at least about 50 percent less than the intrinsic viscosity exhibited by an otherwise substantially identical temperature-responsive polymer that is prepared without using the chain transfer agent.

In another aspect, it is desirable to provide a temperature-responsive polymer that exhibits an effectively low intrinsic viscosity such that the temperature-responsive polymer may then be thermally or solution processed to prepare a flushable material.

In one embodiment, these goals are achieved in a temperature-responsive polymer that exhibits an intrinsic viscosity that is less than about 200 cubic centimeters per gram.

DETAILED DESCRIPTION OF THE INVENTION

The present invention includes a process for preparing a temperature-responsive polymer that exhibits an effectively low intrinsic viscosity such that the temperature-responsive polymer may then be thermally processed to prepare a flushable material.

As used herein, the term "temperature-responsive polymer" is meant to represent a polymer whose water-solubility is dependent on temperature such that the polymer will be generally water soluble below a specific temperature but will be generally water insoluble above the specific temperature. As will be appreciated by those skilled in the art, the specific temperature upon which the water-solubility of a polymer is dependent will generally vary from polymer to polymer. For purposes of the present invention, it is generally desired that the temperature upon which the water-solubility of a polymer is dependent will desirably be between about 20° C. to about 65° C., suitably between about 20° C. to about 35° C., more suitably between about 23° C. to about 28° C., and most suitably about 24° C.

Examples of polymers that are temperature-responsive and may be prepared according to the process of the present invention are polymers whose respective monomers can undergo free radical polymerization including, but are not limited to, poly(N-substituted acrylamides) such as poly(N-isopropylacrylamide), poly(N-propylacrylamide), poly(N-ethoxypropylacrylamide), and poly(N,N-diethylacrylamide), and poly(N-substituted methacrylamides) such as poly(N-isopropyl methacrylamide) and poly(N-ethoxypropyl methacrylamide). In addition, copolymers of these materials may also be prepared that is temperature-responsive. Copolymerization may permit the selection and commingling of advantageous properties of various polymers.

The process of the present invention generally comprises forming a mixture comprising water, an effective amount of a chain transfer agent, a monomer capable of being polymerized to prepare a temperature-responsive polymer, and a reaction catalyst, wherein the mixture is prepared under conditions effective to polymerize the monomer to form a temperature-responsive polymer that exhibits an intrinsic viscosity that is at least about 50 percent less than the intrinsic viscosity exhibited by an otherwise substantially identical temperature-responsive polymer that is prepared without using a chain transfer agent such as isopropanol.

The reaction mixture is typically prepared with an aqueous mixture beneficially comprising at least about 30 weight percent water, suitably at least about 50 weight percent water, more suitably at least about 75 weight percent water, and most suitably about 100 weight percent water. When another liquid is employed with the water, such other suitable liquids include methanol, ethanol, and acetone. However, the use or presence of such other non-aqueous liquids may impede the formation of a reaction mixture that results in a temperature-responsive polymer that exhibits an effective intrinsic viscosity as described herein.

Generally, the order of mixing of the water, chain transfer agent, a reaction catalyst, and monomers capable of undergoing free radical polymerization is not critical in the process of the present invention. However, it may be beneficial to first add the chain transfer agent to the water, then add the monomers to the solution, and finally add a reaction catalyst.

As used herein, a "chain transfer agent" is meant to represent a material that is capable of terminating a growing polymer chain and simultaneously starting a new polymer chain. Chain transfer agents generally decrease the molecular weight of a polymer product and may also decrease the rate at which the polymerization occurs. A chain transfer agent suitable for use in the present invention includes isopropanol and water-soluble thiols. The chain transfer agent should be used in an amount effective to result in a temperature-responsive polymer that exhibits an effective intrinsic viscosity as described herein. Generally, the chain transfer agent will be used in an amount that is beneficially within the range of greater than 0 volume percent to about 50 volume percent of the reaction mixture, suitably from about 1 volume percent to about 40 volume percent of the reaction mixture, and more suitably from about 5 volume percent to about 30 volume percent of the reaction mixture.

A reaction catalyst suitable for use in the present invention includes potassium persulfate. The reaction catalyst should be used in an amount effective to result in a temperature-responsive polymer that exhibits an effective intrinsic viscosity as described herein. Generally, the reaction catalyst will be used in an amount that is beneficially within the range of about 0.001 mole percent to about 2 mole percent, suitably from about 0.01 mole percent to about 0.8 mole percent of the reaction mixture, and more suitably from about 0.02 mole percent to about 0.6 mole percent.

The reaction mixture should be prepared under conditions effective to polymerize the monomer to form a temperature-responsive polymer that exhibits a desired intrinsic viscosity. Thus, the mixture can generally be prepared at any combination of temperature and pressure effective to form the desired temperature-responsive polymer. Generally, such temperatures will beneficially be within the range of from about 10° C. to about 100° C. and suitably within the range of from about 20° C. to about 80° C.

Conventional polymerizations of temperature-responsive polymers are typically carried out in water at a temperature below the water-solubility temperature of the polymer being prepared so that the polymer remains soluble in the reaction mixture. For example, the preparation of poly(N-isopropylacrylamide) is typically carried out at a temperature less than about 34° C. The use of such low temperatures typically leads to low rates of polymerization as well as a low yield, such as less than about 75 percent, of the desired polymer. Furthermore, the viscosity of the reaction mixture is relatively high because essentially all of the prepared polymer remains in the reaction mixture. In contrast, one embodiment of the process of the present invention may be carried out at temperatures greater than the water-solubility temperature of the polymer being prepared. The use of such higher temperatures has been found to increase the rate of polymerization as well as to increase the yield of the polymer such that yields greater than about 75 percent and up to about 100 percent may be achieved. Furthermore, because the polymer being prepared remains insoluble at such a higher temperature, the reaction solution viscosity remains relatively low throughout the polymerization process since the prepared polymer precipitates out of the reaction solution as it is prepared.

Many temperature-responsive polymers, however, tend to crosslink when polymerized at relatively higher temperatures thereby resulting in an insoluble material. Therefore, one purpose of using the chain transfer agent is to minimize any crosslinking reactions of the prepared temperature-responsive polymer. Another purpose of using the chain transfer agent is to control the molecular weight of the prepared temperature-responsive polymer. This is thus in contrast to most known polymerization processes in which a chain transfer agent serves only a molecular weight regulator. Therefore, by combining a precipitation polymerization process with the use of a chain transfer agent, it is possible to prepare a temperature-responsive polymer with a controlled molecular weight and at a relatively high yield.

It has been found that the temperature-responsive polymer prepared by the process of the present invention, wherein a chain transfer agent such as isopropanol is used, exhibits surprisingly improved intrinsic viscosity properties. In particular, the temperature-responsive polymer prepared by the process of the present invention exhibits significantly lower intrinsic viscosity values as compared to an otherwise substantially identical temperature-responsive polymer that is prepared without using the chain transfer agent.

As such, the temperature-responsive polymer of the present invention exhibits an intrinsic viscosity that is beneficially less than about 200 cubic centimeters per gram, suitably less than about 150 cubic centimeters per gram, more suitably less than about 100 cubic centimeters per gram, and most suitably less than about 75 cubic centimeters per gram. In addition, the temperature-responsive polymer of the present invention exhibits an intrinsic viscosity that is beneficially less than about 50 percent, suitably less than about 40 percent, more suitably less than about 30 percent, and most suitably less than about 20 percent of the intrinsic viscosity exhibited by an otherwise substantially identical temperature-responsive polymer that is prepared without using the chain transfer agent.

As used herein, the term "an otherwise substantially identical temperature-responsive polymer that is prepared without using a chain transfer agent" or other similar terms are intended to refer to a control temperature-responsive polymer that is prepared using substantially identical materials and a substantially identical process as compared to a temperature-responsive polymer of the present invention, except that the control temperature-responsive polymer is prepared by a process that does not use a chain transfer agent as described herein. As a result of not being prepared according to the method of the present invention, the control temperature-responsive polymer generally will not exhibit the improved intrinsic viscosity properties as described herein.

Because the temperature-responsive polymer of the present invention exhibits improved intrinsic viscosity values, the temperature-responsive polymer is capable of being thermally processed to form such materials as fibers, films, and other thermally processed forms of the temperature-responsive polymer. Such a thermal process may include, for example, thermal extrusion.

In one embodiment of the present invention, a disposable absorbent product is provided, which disposable absorbent product comprises a liquid-permeable topsheet, a backsheet attached to the topsheet, an absorbent structure positioned between the topsheet and the backsheet, wherein the backsheet comprises a temperature-responsive polymer prepared by the process of the present invention.

Those skilled in the art will recognize materials suitable for use as the topsheet and backsheet. Exemplary of materials suitable for use as the topsheet are liquid-permeable materials, such as spunbonded polypropylene or polyethylene having a basis weight of from about 15 to about 25 grams per square meter. Exemplary of materials suitable for use as the backsheet, in addition to the temperature-responsive polymer of the present invention, are liquid-impervious materials, such as polyolefin films, as well as vapor-pervious materials, such as microporous polyolefin films.

The temperature-responsive polymer of the present invention will generally be employed in a disposable absorbent product comprising an absorbent structure. Such an absorbent structure will generally comprise a fibrous matrix into which an absorbent material such as, for example, a hydrogel-forming polymeric material is dispersed such that the fibrous matrix constrains or entraps the absorbent material.

The fibrous matrix may be formed by air-laying fibers, through a spunbond or meltblown process, a carding process, a wet-laid process, or through essentially any other means, known to those skilled in the art, for forming a fibrous matrix.

Methods of incorporating an absorbent material into a fibrous matrix are known to those skilled in the art. Suitable methods include incorporating an absorbent material into the matrix during formation of the matrix, such as by air laying the fibers of the fibrous matrix and the absorbent material at the same time or wet-laying the fibers of the fibrous matrix and the absorbent material at the same time. Alternatively, it is possible to apply the absorbent material to the fibrous matrix after formation of the fibrous matrix. Other methods include sandwiching the absorbent material between two sheets of material, at least one of which is fibrous and liquid permeable. The absorbent material may be generally uniformly located between the two sheets of material or may be located in discrete pockets formed by the two sheets. The absorbent material may be distributed in the individual layers in a generally uniform manner or may be present in the fibrous layers as a layer or other nonuniform distribution.

The fibrous matrix may be in the form of a single, integrally formed layer or of a composite comprising multiple layers. If the fibrous matrix comprises multiple layers, the layers are preferably in liquid communication with one another such that a liquid present in one fibrous layer can flow or be transported to the other fibrous layer. For example, the fibrous layers may be separated by cellulosic tissue wrap sheets known to those skilled in the art.

When the fibrous matrix comprises a single, integrally formed layer, the concentration of absorbent material may increase along the thickness of the fibrous matrix in a gradual, nonstepwise fashion or in a more stepwise fashion. Similarly, the density may decrease through the thickness in a nonstepwise manner or in a stepwise manner. Absorbent structures may generally be of any size or dimension as long as the absorbent structure exhibits desired absorbent characteristics.

Absorbent structures are generally suited to absorb many liquids, such as water, saline, and synthetic urine, and body liquids such as urine, menses, and blood, and are suited for use in disposable absorbent products such as diapers, adult incontinent products, and bed pads; in catamenial devices such as sanitary napkins, and tampons; and in other absorbent products such as wipes, bibs, wound dressings, and surgical capes or drapes.

Disposable absorbent products, according to all aspects of the present invention, are generally subjected during use to multiple insults of a body liquid. Accordingly, the disposable absorbent products are desirably capable of absorbing multiple insults of body liquids in quantities to which the absorbent products and structures will be exposed during use. The insults are generally separated from one another by a period of time.

After the disposable absorbent product has been used, it will be desirable to dispose of the disposable absorbent product. If the disposable absorbent product includes the temperature-responsive polymer of the present invention, it may be possible to dispose of the product directly to a liquid disposal system, such as by disposing of the product into a toilet. When placed into a toilet, an excess of water will generally be present such that the temperature-responsive polymer of the present invention may rapidly disperse into the water. The disposable absorbent product may then be capable of being flushed down the toilet without fear of the disposable absorbent product clogging the piping of the toilet. By this method of disposal, the disposable absorbent product may then be successfully treated and degraded by the sewage system to which the toilet is attached instead of disposing of the disposable absorbent product through a solid waste disposable system. By not having to be disposed of through a solid waste disposable system, the use of the temperature-responsive polymer of the present invention may reduce the amount of solid waste that has to be landfilled, incinerated, or otherwise disposed of.

Test Methods

Intrinsic Viscosity

Intrinsic viscosity is a parameter which directly reflects the molecular properties of a dissolved polymer. For a flexible polymer the intrinsic viscosity is related to $M^a$ where M represents the molecular weight of the polymer and $0.50 \leq a \leq 0.80$. Intrinsic viscosity ($[\eta]$) is calculated using the following equations:

$$([\eta]) = \lim_{c \to 0}(1/c)\{(\eta/\eta_o) - 1\} \quad \text{Equation 1}$$

wherein:

$\eta$ = the solution viscosity at a given polymer concentration $\eta_o$ = the solvent viscosity and:

$$\eta/\eta_o = t/t_o \quad \text{Equation 2}$$

wherein:

t = the time for a polymer solution to flow through a viscometer $t_o$ = the time for a solvent to flow through a viscometer A Canon Fenske viscometer was used to measure the relative viscosity of a polymer solution with respect to viscosity of deionized water, which was used as the solvent. Viscometer numbers 100 and 150 were used. The flow time for deionized water at room temperature for viscometer number 100 was about 58.5 seconds and that for viscometer number 150 was about 28.5 seconds. Higher viscosity polymer samples, such as poly(N-iospropylacrylamide), were studied using viscometer number 150 and lower viscosity polymer samples were studied using viscometer number 100.

The relative viscosities for a polymer sample were measured at 5 different polymer concentrations. The right hand side of Equation 1 (y-axis) was plotted against polymer concentration (x-axis). On extrapolation to zero concentration, the intercept on the y-axis yields the intrinsic viscosity for the polymer sample.

Melt Viscosity

The melt viscosity for a polymer sample was measured on a Gottfert Rheograph 2003 capillary rheometer. The barrel diameter of the rheometer was about 12.00+0.01 millimeter and the piston diameter was 11.99–0.01 millimeter. The barrel was heated by three heaters with which the temperature to be used can be set between about 60° C. to about 400° C. A round hole capillary was used with an L/D ratio of about 30/1. The diameter of the capillary was about 1.00 millimeter.

The polymer sample to be evaluated was ground to a coarse powder and then fed into the barrel of the rheometer. The rheometer measures the apparent melt viscosity versus shear rate. As reported herein, the melt viscosity for a polymer sample was measured at a shear rate of about 1000 $sec^{-1}$ since such a shear rate is similar to the shear rate encountered in many commercial extrusion processes. The melt viscosity values of the poly(N-isopropylacrylamide) samples prepared herein were measured at a temperature of about 220° C. and are reported in Pascal seconds (Pa.sec). A polymer sample was allowed to melt for about 4 minutes at 220° C. before taking the melt viscosity value measurement.

Water Solubility Temperature

Polymers that are temperature responsive exhibit cloud points wherein the polymer precipitates out of solution on heating the solution above the cloud point. On precipitation the solution turns turbid and the cloud point can be measured. Solutions containing between about 0.2 weight percent to about 1.0 weight percent are used for determining the water solubility temperature for a polymer. The solution was poured into a scintillation vial. A thermometer was dipped into this solution and clamped in position with the help of a laboratory stand. A small magnetic stirrer was used for agitation. The solution in the vial was heated at a temperature increase of about 1° C. per minute. The temperature at which the thermometer bulb became invisible due to solution turbidity was recorded as the cloud point.

EXAMPLES

Example 1

To a 0.45 M aqueous solution of N-isopropylacrylamide, available from Eastman Chemical Company, was added 0.4 mole percent potassium persulfate, available from Aldrich Chemical Company, at about room temperature (about 23° C.) under a nitrogen atmosphere. The reaction was allowed to proceed for about 8 hours at about 30° C. The polymer was removed from the reaction mixture by heating the mixture above the cloud point of the polymer so that the polymer could be recovered. The polymer was then washed with warm water and dried under vacuum. The yield of the polymer was about 50 percent. The prepared polymer was found to exhibit an intrinsic viscosity of about 437 cubic centimeters per gram and a melt viscosity of about 407 Pa.sec. Because of its high intrinsic viscosity, the polymer was not thermally processable.

Example 2

About 22.8 grams (about 0.2 mole) of N-isopropylacrylamide was dissolved in about 200 milliliters of deionized water at about room temperature (about 23° C.) under a nitrogen atmosphere. The solution was heated to about 55° C. and about 0.123 gram (about 0.0004 mole) of potassium persulfate was added to the solution at once. A white precipitate was observed to form immediately in the solution. The reaction was allowed to proceed for about 4 hours at about 55° C. The polymer was then removed from the reaction vessel, washed with warm water, and dried under vacuum at about 50° C. to a constant weight. The yield of the polymer was quantitative. The polymer was placed into water and allowed to stand for about 48 hours at the end of which gel particles of the polymer were still observed. Since the polymer was not completely soluble in water, the polymer was believed to be crosslinked.

Example 3

About 113.1 grams (about 1 mole) of N-isopropylacrylamide was dissolved in a mixture of about 712 milliliters of deionized water and about 38 milliliters of isopropanol (about 5 percent by volume), available from Mallinchrodt Specialty Chemicals Company, at about room temperature (about 23° C.) under a nitrogen atmosphere. The solution was heated to about 52° C. and potassium persulfate was added to the solution at once. The solution was observed to become cloudy in a few minutes. The temperature of the mixture increased to about 68° C., believed to be because of the heat generated during the polymerization. The reaction was allowed to proceed for about 4 hours. The polymer was then removed from the reaction vessel, washed with warm water, and dried under vacuum at about 50° C. to a constant weight. The yield of the polymer was quantitative. The polymer was completely water soluble in water, indicating essentially no crosslinking of the polymer. The prepared polymer was found to exhibit an intrinsic viscosity of about 131 cubic centimeters per gram and a melt viscosity of about 312 Pa.sec. Fibers with good mechanical strength and clarity were prepared using the polymer in a thermal extrusion process.

Example 4

A process similar to that described in Example 3 was used except that about 10 percent by volume of isopropanol was used to prepare the initial mixture with water. The prepared polymer was found to exhibit an intrinsic viscosity of about 83 cubic centimeters per gram and a melt viscosity of about 209 Pa.sec. Fibers with good mechanical strength and clarity were prepared using the polymer in a thermal extrusion process.

Example 5

A process similar to that described in Example 3 was used except that about 15 percent by volume of isopropanol was used to prepare the initial mixture with water. The prepared polymer was found to exhibit an intrinsic viscosity of about 68 cubic centimeters per gram and a melt viscosity of about 186 Pa.sec. Fibers with good mechanical strength and clarity were prepared using the polymer in a thermal extrusion process.

Example 6

A process similar to that described in Example 3 was used except that about 20 percent by volume of isopropanol was used to prepare the initial mixture with water. The prepared polymer was found to exhibit an intrinsic viscosity of about 50 cubic centimeters per gram and a melt viscosity of about 156 Pa.sec. Fibers with good mechanical strength and clarity were prepared using the polymer in a thermal extrusion process.

Example 7

To an about 1 M aqueous solution of N,N-diethylacrylamide was added about 0.2 mole percent potassium persulfate at about room temperature (about 23° C.) under a nitrogen atmosphere. The reaction was allowed to proceed for about 24 hours at about 21.6° C. The polymer was precipitated in warm water, washed with warm water, and dried under vacuum. The prepared polymer was found to exhibit an intrinsic viscosity of about 292 cubic centimeters per gram.

Example 8

About 41.3 grams (about 0.325 mole) of N,N-diethylacrylamide was dissolved in a mixture of about 244 milliliters of deionized water and about 27 milliliters of isopropanol. The solution was purged with nitrogen at about 65° C. for about 30 minutes. Potassium persulfate (about 0.18 gram; about 0.00065 mole) was added to the solution at once. The reaction was allowed to proceed for about 3 hours. The polymer was then removed from the reaction vessel, washed with warm water, and dried under vacuum. The prepared polymer was found to exhibit an intrinsic viscosity of about 23 cubic centimeters per gram.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A process for preparing a temperature-responsive, water-soluble polymer by precipitation polymerization, wherein the polymer is soluble in water at a temperature below a specific temperature and is insoluble in water above the specific temperature, the process comprising:

forming a reaction mixture comprising water, a chain transfer agent, and a monomer capable of being polymerized to form the temperature-responsive polymer;

heating the reaction mixture to a temperature above the specific temperature at which the temperature-responsive, water-soluble polymer to be formed is soluble, wherein the temperature is less than about 100° C.; and adding a reaction catalyst to the reaction mixture to polymerize the monomer and form the temperature-responsive polymer;

wherein the polymer precipitates out of the reaction mixture as it is formed;

wherein the chain transfer agent is isopropanol, the monomer is N-isopropylacrylamide, and the reaction catalyst is potassium persulfate;

wherein the polymer exhibits an intrinsic viscosity that is less than about 50 percent of the intrinsic viscosity exhibited by an otherwise substantially identical temperature-responsive polymer that is prepared without using the chain transfer agent;

and wherein the intrinsic viscosities are measured in water at room temperature.

2. The process of claim 1 wherein the temperature-responsive polymer is soluble in water below a temperature that is between about 20° C. to about 35° C.

3. The process of claim 2 wherein the temperature-responsive polymer is soluble in water below a temperature that is between about 23° C. to about 28° C.

4. The process of claim 1 wherein the temperature-responsive polymer exhibits an intrinsic viscosity measured in water at room temperature that is less than about 200 cubic centimeters per gram.

5. The process of claim 4 wherein the temperature-responsive polymer exhibits an intrinsic viscosity measured in water at room temperature that is less than about 150 cubic centimeters per gram.

6. The process of claim 5 wherein the temperature-responsive polymer exhibits an intrinsic viscosity measured in water at room temperature that is less than about 100 cubic centimeters per gram.

7. The process of claim 1 wherein the temperature-responsive polymer exhibits an intrinsic viscosity that is less than about 40 percent of the intrinsic viscosity exhibited by an otherwise substantially identical temperature-responsive polymer that is prepared without using the chain transfer agent.

8. The process of claim 1 wherein the reaction mixture has a volume and the chain transfer agent is used in an amount that is within the range of greater than 0 volume percent to about 50 volume percent of the reaction mixture.

9. The process of claim 1 wherein the reaction mixture has a volume and the chain transfer agent is used in an amount that is within the range of about 1 volume percent to about 40 volume percent of the reaction mixture.

10. The process of claim 1 wherein the reaction catalyst is potassium persulfate.

11. The process of claim 1 wherein the reaction catalyst is used in an amount that is within the range of about 0.001 mole percent to about 2 mole percent of the reaction mixture.

12. The process of claim 1 wherein the temperature-responsive polymer is soluble in water below a temperature that is between about 20° C. to about 35° C., and exhibits an intrinsic viscosity that is less than about 200 cubic centimeters per gram, and the reaction mixture has a volume and the chain transfer agent is used in an amount that is within the range of greater than 0 volume percent to about 50 volume percent of the reaction mixture.

13. The process of claim 1, wherein the reaction mixture consists essentially of water, a chain transfer agent, and a monomer.

14. The process of claim 1, wherein the process proceeds with minimal cross-linking of the polymer.

15. A process for preparing a temperature-responsive, water-soluble polymer, the process consisting essentially of:
   forming an aqueous reaction mixture comprising water, a chain transfer agent, and a monomer capable of being polymerized to form the temperature-responsive polymer; and
   adding a reaction catalyst to the reaction mixture at a temperature above a trigger temperature of the polymer; said trigger temperature being equal to a temperature above which the water-soluble polymer becomes insoluble in water; wherein the chain transfer agent minimizes crosslinking reactions of the temperature-responsive polymer, and wherein the chain transfer agent is isopropanol, the monomer is N-isopropylacrylamide, and the reaction catalyst is potassium persulfate.

16. The process of claim 15, wherein the trigger temperature is from about 20° C. to about 35° C.

17. A process for preparing a temperature-responsive, water-soluble polymer, wherein the polymer is soluble in water at a temperature below a certain temperature and is insoluble in water at a temperature above the certain temperature, the process comprising:
   forming a reaction solvent having a single aqueous phase consisting essentially of water;
   adding isopropanol as the chain transfer agent, and N-isopropylacrylamide as the monomer to the water to form a reaction mixture;
   heating the reaction mixture to a temperature above the certain temperature at which the temperature-responsive, water-soluble polymer to be formed is insoluble; and
   adding potassium persulfate as the reaction catalyst to the reaction mixture to polymerize the monomer and form the temperature-responsive polymer.

18. The process of claim 17, wherein the process proceeds with minimal cross-linking of the polymer.

* * * * *